(12) United States Patent
Bertolini et al.

(10) Patent No.: US 12,516,697 B2
(45) Date of Patent: Jan. 6, 2026

(54) BEARING UNIT WITH ROLLING BODIES WITH A CO-MOLDED INNER RING

(71) Applicant: AKTIEBOLAGET SKF, Götenborg (SE)

(72) Inventors: Andrea A. Bertolini, Carrara (IT); Alessio Nebbia Colomba, Pisa (IT); Fausto Baracca, Massa (IT); Fabio Cavacece, Rome (IT)

(73) Assignee: AKTIEBOLAGET SKF, Gotenborg (SE)

( * ) Notice: Subject to any disclaimer, the term of this patent is extended or adjusted under 35 U.S.C. 154(b) by 57 days.

(21) Appl. No.: 18/214,731

(22) Filed: Jun. 27, 2023

(65) Prior Publication Data

US 2024/0003387 A1  Jan. 4, 2024

(30) Foreign Application Priority Data

Jul. 4, 2022  (IT) ........................ 102022000014077

(51) Int. Cl.
*F16C 33/58* (2006.01)
*F16C 33/76* (2006.01)
*F16C 23/08* (2006.01)

(52) U.S. Cl.
CPC ............ *F16C 33/586* (2013.01); *F16C 33/76* (2013.01); *F16C 23/084* (2013.01)

(58) Field of Classification Search
CPC .... F16C 35/063; F16C 23/084; F16C 23/082; F16C 23/08; F16C 33/60; F16C 33/586; F16C 33/76
See application file for complete search history.

(56) References Cited

U.S. PATENT DOCUMENTS

| | | | | |
|---|---|---|---|---|
| 1,513,375 A | * | 10/1924 | Dlesk, Jr. | ................ F16C 43/06 384/541 |
| 3,672,734 A | * | 6/1972 | Bando | ................... F16C 27/066 384/536 |

(Continued)

FOREIGN PATENT DOCUMENTS

EP          2740955          6/2014

OTHER PUBLICATIONS https://www.matweb.com/search/datasheet_print.aspx?matguid=52f30999f11d424685dd5660047fef89 (Year: 2024).*

(Continued)

*Primary Examiner* — James Pilkington
*Assistant Examiner* — Aimee Tran Nguyen
(74) *Attorney, Agent, or Firm* — Stinson LLP

(57) ABSTRACT

A bearing unit with rolling bodies for use in the food and beverage industry, for example, is disclosed herein. The example embodiments disclosed herein provide that of a bearing unit comprising a radially inner ring including a stainless steel collar with a raceway, on which two sleeves made of reinforced polymeric material are co-molded on opposite sides. Such example embodiments incorporate corrosion resistance properties of a polymeric material without losing the surface hardness properties. As such, the radially inner ring of the bearing unit offers same nominal load values as inner rings are made entirely of metal, but with better corrosion resistance without losing the surface hardness properties.

31 Claims, 2 Drawing Sheets

(56) References Cited

U.S. PATENT DOCUMENTS

| | | | | |
|---|---|---|---|---|
| 3,912,412 A | * | 10/1975 | Struttmann | F16C 35/073 403/368 |
| 2016/0290401 A1 | * | 10/2016 | Murakami | F16C 33/7826 |
| 2021/0348653 A1 | | 11/2021 | Baracca et al. | |

OTHER PUBLICATIONS https://plantech.com/convert-different-durometer-shore-types/ (Year: 2024).*

International Search Report for corresponding Italy Patent Application No. 102022000014077 dated Jan. 27, 2023.

* cited by examiner

BEARING UNIT WITH ROLLING BODIES WITH A CO-MOLDED INNER RING

CROSS-REFERENCE TO RELATED APPLICATIONS

This application is based on and claims priority to Italian Patent Application No. 102022000014077 filed on Jul. 4, 2022, under 35 U.S.C. § 119, the disclosure of which is incorporated herein by reference in its entirety.

BACKGROUND

The present disclosure generally relates to a bearing unit with rolling bodies, provided with a radially inner ring co-molded with reinforced polymeric material, which are used in the food and beverage (F&B) industry.

BRIEF DESCRIPTION OF THE DRAWINGS

The disclosure will now be described with reference to the attached drawings, which show some non-limiting embodiments of the bearing unit, in which.

DETAILED DESCRIPTION

Figure 1:
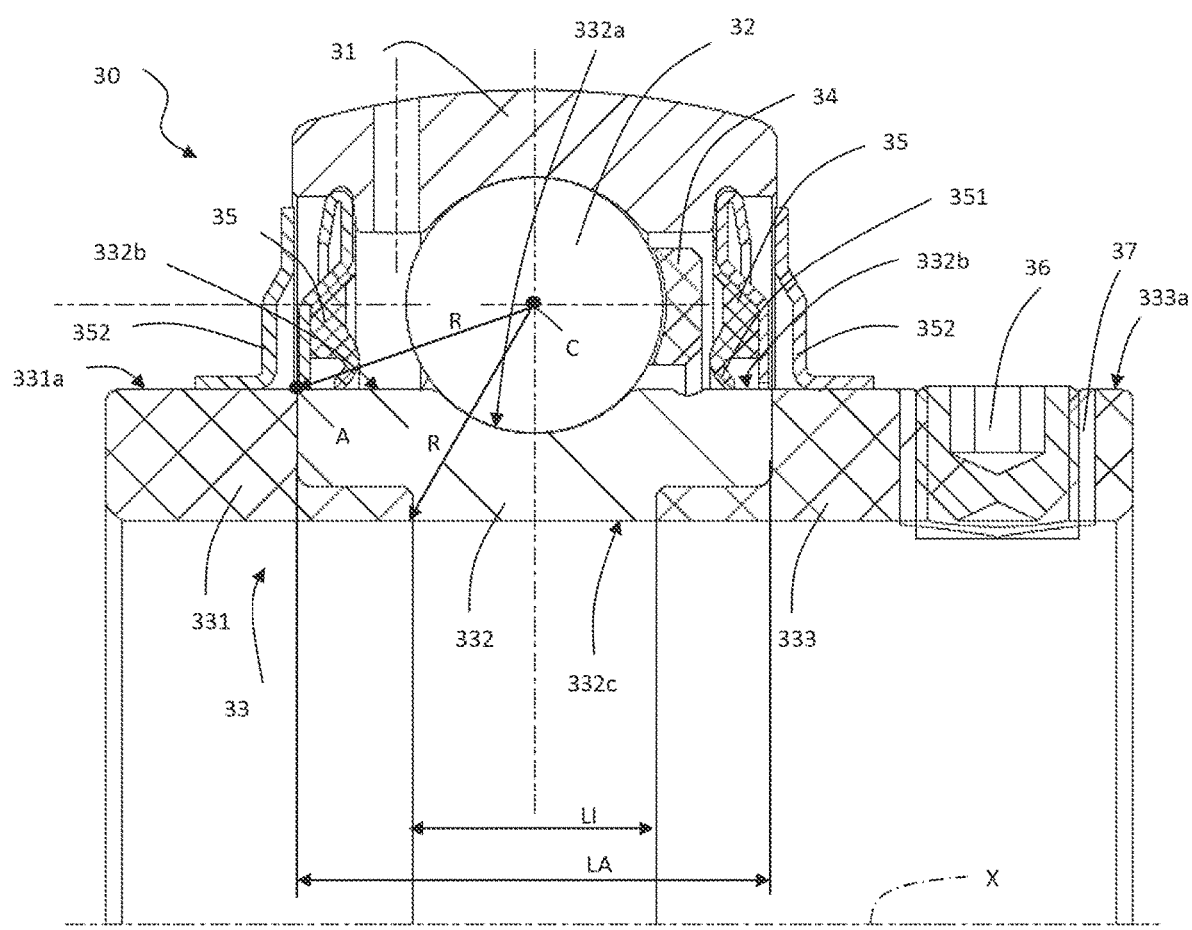
FIG. 1 shows a cross-sectional view of a bearing unit with a radially inner ring made of reinforced polymeric material according to exemplary embodiments of the present disclosure.

Bearing units having rolling elements or bodies which are generally used to allow relative movement between one component or group and another component or group. The bearing unit generally comprises a first component, for example a radially outer ring, which is secured to a stationary element; and a second component, for example a radially inner ring, which is secured to a rotary element. In roller bearing units, the rotation of one ring with respect to the other is made possible by a plurality of rolling elements positioned between the cylindrical surface of one component and the cylindrical surface of the second component, usually referred to as raceways. The rolling elements may be balls, cylindrical or conical rollers, needle rollers and/or similar rolling elements.

In bearing unit applications, one of the main problems has always been the appearance of a layer of corrosion on the exposed metal surfaces. In food and beverage (F&B) applications, the exposed metal surfaces are primarily those of the radially inner ring. The speed at which corrosion can occur depends on the material from which the rings of the bearings are made but, in general, it always occurs within 48 hours or so in a corrosive environment. Corrosion testing can be carried out, for example, by means of a salt spray test in accordance with standard ISO 9227.

Although stainless steel bearing units have better anti-corrosion behavior, even these bearing units are susceptible to corrosion. For obvious reasons, these bearing units are used in particular in F&B applications where preventing contamination of food is essential for the end customer.

In general, stainless steel offers very high performance in terms of corrosion resistance. The presence of corrosion even in stainless steel bearing units is explained by the fact that this steel may be heat-treated to increase the surface hardness. In other words, stainless steel may be tempered. This is because the rings of the bearing units are subjected to high "Hertzian" pressure exerted by the rolling bodies on the raceways. So that it can be tempered, the stainless steel may obviously have a high carbon content. A higher carbon content in stainless steel means a low corrosion resistance. The problem is therefore linked to the higher carbon content, which reduces the corrosion resistance, the reduction being all the more rapid the higher the increase in carbon content in the stainless steel.

The problem is not as great in some stainless steels, for example, AISI 300 series steels. However, using such stainless steels it is impossible to reach a surface hardness compatible with the strength required for the raceways of the bearing units.

One possible solution affording a surface hardness compatible with that required by the raceways while at the same time having a material more resistant to corrosion (possibly also including a passivation process) would be, for example, an AISI 400 series stainless steel. However, even so, the results obtained in terms of the surface strength/corrosion resistance trade-off are not satisfactory.

Another possible solution would be to use a standard material, for example galvanized steel, for the inner ring of the bearing unit. However, this material is not at all accepted in the food and beverage industry. Stainless steel bearing units are preferred because the galvanized surface can be scratched or damaged during operation of the bearing unit.

There is, therefore, a need to define a bearing unit with a radially inner ring that does not have the abovementioned drawbacks.

The example embodiments disclosed herein incorporate the corrosion resistance properties of a polymeric material without losing the surface hardness properties offered by solutions using metal. The example embodiments disclosed herein therefore aim to provide a solution with a radially inner ring that offers the same nominal load values as inner rings are made entirely of metal, but with better corrosion resistance in problematic environments as found in the food and beverage industry. This is achieved by means of a bearing unit provided with a radially inner ring comprising of a stainless steel collar with a raceway, on which two sleeves made of reinforced polymeric material are co-molded on opposite sides.

Therefore, the present disclosure provides a bearing unit comprising a radially inner ring with the features as disclosed herein. With reference in particular to FIG. 1, the bearing unit 30 for use in the food and beverage industry may include, for example, a radially outer ring 31, preferably rotatable, for example on rollers, about a central axis of rotation X of the bearing unit 30; a radially inner ring 33, preferably stationary with respect to the outer ring 31; a row of rolling elements 32, in this case balls, interposed between the radially outer ring 31 and the radially inner ring 33, and a cage 34 for holding the rolling elements in order to keep the rolling elements of the row of rolling elements 32 in position.

As disclosed herein, terms and expressions indicating positions and orientations, such as "radial" and "axial", are to be understood with reference to the central axis of rotation X of the bearing unit 30.

To simplify the drawings, the reference sign 32 will designate both individual balls and the row of balls. Again for the sake of simplicity, the term "ball" may be used by way of example in the present description and in the attached drawings instead of the more generic term "rolling element" (with the same numerical references also being used). Some embodiments and the related drawings may use rolling elements other than balls (for example rollers), without departing from the scope of the present disclosure.

The bearing unit 30 also has a pair of sealing devices 35 for sealing off the bearing unit from the external environment. The two sealing devices being arranged on axially opposite sides with respect to the row of rolling bodies 32.

With reference to FIGS. 2A-B and 3A-B, according to an example embodiment of the present disclosure, the radially inner ring 33 of the bearing unit 30 may include three portions assembled together. These three portions include a first sleeve 331 made of reinforced polymeric material; a stainless steel collar 332 provided with a raceway 332a; and a second sleeve 333 also made of reinforced polymeric material.

In particular, the stainless steel collar 332 forms the central portion of the radially inner ring 33 and, around the collar, on axially opposite sides; and the two sleeves 331, 333 are made of reinforced polymeric material that are co-molded. The reinforced polymeric material thus replaces the metal over all of the exposed surfaces of the radially inner ring 33, except those that have to have good mechanical strength. Specifically, the raceway 332a, so as to ensure the required performance, in other words the resistance to "Hertzian" pressure from the rolling bodies 32; the radially external cylindrical surface 332b of the collar 332 which, on axially opposite sides, forms a shoulder towards the raceway 332a and on which one or more contacting lips 351 of the sealing device 35 act.

This surface 332b may therefore have strength properties to prevent the wear caused by the friction of the contacting lips and will thus still be made of metal. This is because the use of reinforced polymeric material would give rise to unacceptable wear of the material. The presence of the radially external surface 332b is therefore necessary where the contacting lips 351 of the sealing devices 35 may come into contact with the radially inner ring 33 and therefore its axial length (LA) may be not less than the axial dimension of the contacting lips of the sealing devices 35. The radially external surface 332b, made of steel, is not however necessary for the assembly of metal shields 352, which are axially external with respect to the contacting lips 351 and arranged, as per the prior art, to protect the contacting lips 351. The metal shields 352 may be assembled by interference on radially external surfaces 331a and 333a of the corresponding sleeves 331 and 333 made of reinforced polymeric material, since they are rigidly secured to these surfaces and do not give rise to wear as a result of sliding.

Moreover, the axial length (LI) of the radially inner cylindrical surface 332c is equivalent to the chord of a circumference whose center (C) coincides with the center of the row of rolling bodies 32 and whose radius (R) joins the center (C) with a point (A) axially extreme along the surface 332b of the collar 332. The purpose of this is to give sufficient radial thickness to the steel collar 332 in such a way as to ensure its mechanical strength for the working life of the bearing unit 30.

The second sleeve 333 differs from the first sleeve 331 in that it has a pair of holes 333b, arranged circumferentially. Each hole of this pair of holes represents the seat for a corresponding pair of grub screws 36 which constitute the clamping device for clamping the radially inner ring 33 of the bearing unit 30 to a machine shaft. Because the sleeve 333 is made of polymeric material, it is desirable not to screw the grub screws 36 directly to the sleeve 333, but instead each is screwed in a metal-threaded bushing 37. Each bushing of the pair of threaded bushings 37 is housed in one of the two holes 333b in the second sleeve 333.

The threaded bushing 37 is obtained by molding a metal insert inside the polymeric material of the sleeve 333. This metal bushing 37 may not rotate during the process of tightening the grub screws 36 in their seat. Two solutions are therefore possible. First, the threaded bushing 37 is co-molded with the reinforced polymeric material in the same production phase. And, second, the threaded bushing 37 may be provided with anti-rotational features, in other words corners or in any case asymmetrical features. Thus, for example, the threaded bushing 37 may have a hexagonal or square outer shape.

If the metal collar 332 of the radially inner ring 33 is co-molded at the end of its manufacturing process (and therefore the collar already complies with the tolerances of the finished part), the reinforced polymeric material may cover all remaining exposed surfaces except for those mentioned above (raceway 332a and radially external surface 332b), which may still be made of steel.

Alternatively, if the metal collar 332 of the radially inner ring 33 is co-molded before its final manufacturing process (in other words the collar has yet to undergo final machining), the radially internal surface of the ring 33, on the same side as the first sleeve 331 (sleeve not having the locking mechanism with grub screws), may be left metal to allow grinding so as to use this surface as a reference for all future machining processes.

Figures 2A, 2B:
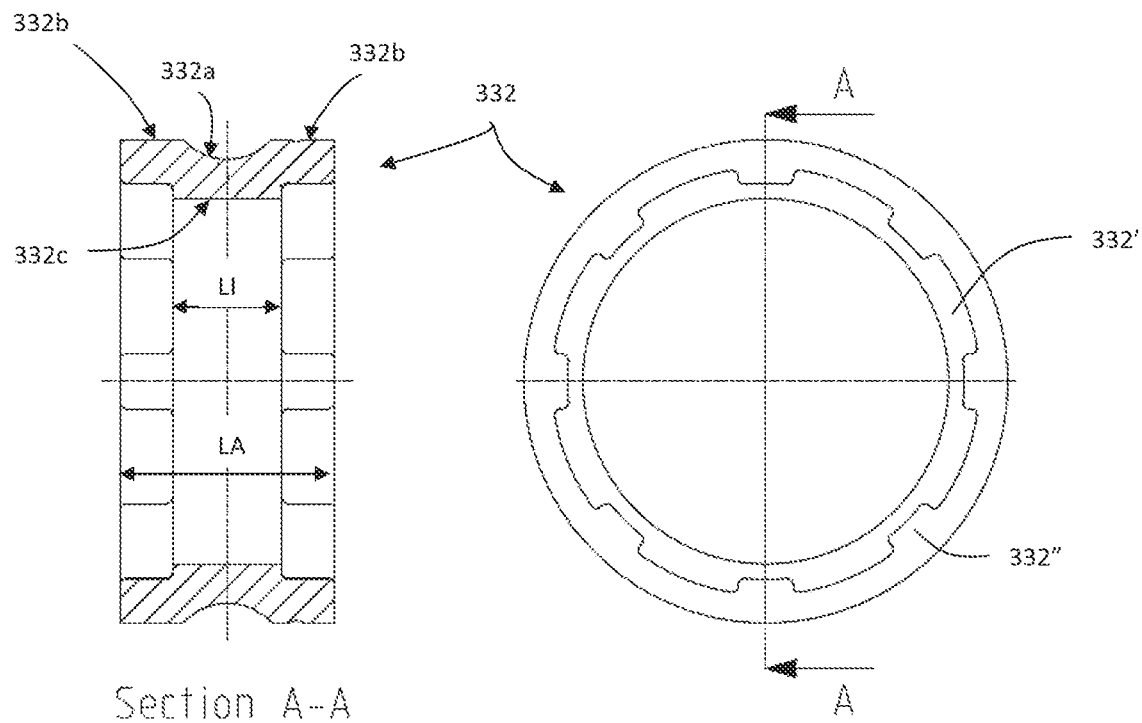
FIG. 2A shows a cross-sectional view of a stainless steel collar comprising a raceway of the radially inner ring illustrated in FIG. 1.
FIG. 2B shows a side view of the stainless steel collar comprising the raceway of the radially inner ring illustrated in FIG. 1.
Figures 3A, 3B:
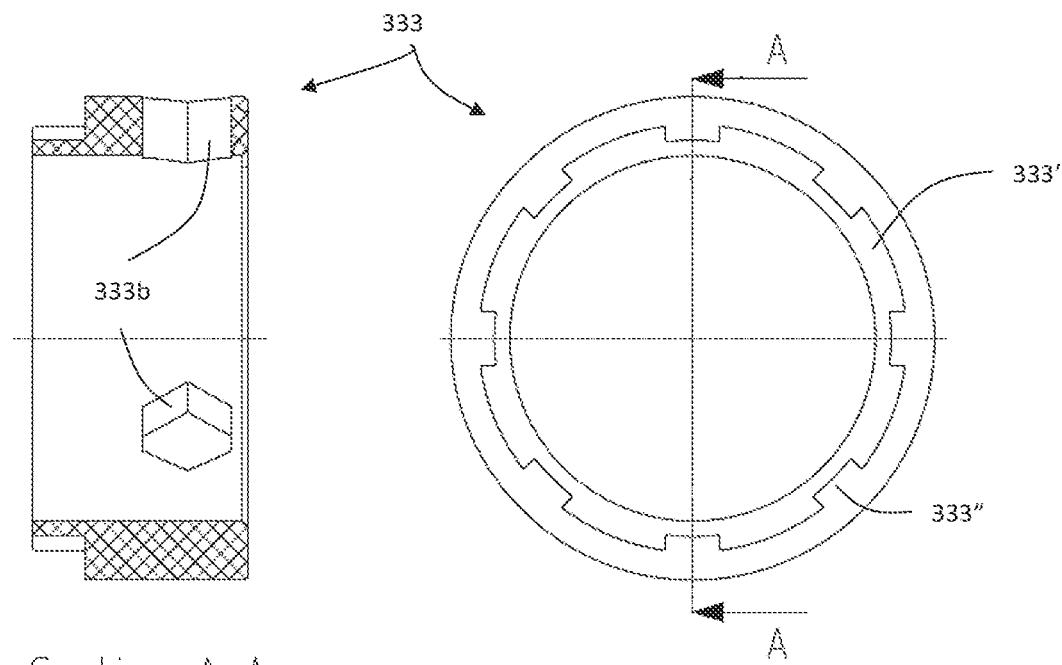
FIG. 3A shows a cross-sectional view of a sleeve made of reinforced polymeric material of the radially inner ring illustrated in FIG. 1.
FIG. 3B shows a side view of the sleeve made of reinforced polymeric material of the radially inner ring illustrated in FIG. 1.

The collar 332 and the second sleeve 333 have, at the facing axial ends, a plurality of teeth arranged circumferentially and distributed uniformly around the axis X, alternating with a plurality of grooves, also arranged circumferentially and distributed uniformly around the axis X. In FIGS. 2b and 3b, teeth and grooves are indicated using the reference signs 332' and 332", respectively, for the collar 332; and the reference signs 333' and 333", respectively, for the sleeve 333. Preferably, the axial ends 332" of the plurality of teeth 332' of the collar 332 are polygonal, as are the axial ends 333" of the plurality of teeth 333' of the sleeve 333.

In the finished component, the teeth 332' of the collar 332 axially face and engage with corresponding grooves 333" in the sleeve 333; and the teeth 333' of the sleeve 333 axially face and engage with corresponding grooves 332" in the collar 332.

More specifically, during the co-molding operation, the teeth and grooves of the collar serve as cores for the molding of the sleeves and give rise to the formation of corresponding grooves and teeth in the sleeve.

By virtue of this solution with anti-rotational features, it is ensured that there will be no relative rotation between the collar and the sleeve in use. Moreover, the lateral surfaces 332", 333" of corresponding teeth of the collar and of the sleeve is in contact with one another increase the resistance to friction, which can even counteract any axial pulling between the two components.

These anti-rotational features may be produced in other forms, for example, they may be annular cylindrical recesses and corresponding annular cylindrical protrusions. The anti-rotational features will be present on the collar 332 and the first sleeve 331.

The solution of the radially inner ring 33 according to the present disclosure has further technical features. For example, it is possible to tailor the color of the reinforced polymeric material to specific requirements or requests of the end customer.

The reinforced polymeric material may also be optimized according to the performance required, occasionally prioritizing temperature resistance and mechanical performance over corrosion resistance against most chemical substances.

Since, as seen above, the metal shields for protecting the sealing devices will be assembled by interference on the surfaces of the sleeves made of reinforced polymeric material, this polymeric material may be optimized also with a view to obtaining a high degree of hardness. The Shore A value recommended for a material suitable for this type of application should be at least 80.

One example of a reinforced polymeric material, which complies with the above hardness value, is polypropylene with 40% glass fiber (also known as PP GF40). This material has further features that are suitable for the required application. For example, in the case of polypropylene with 40% glass fiber, the water absorption (immersion for 24 hours) is below the flexural modulus is above 7.5 GPa and the tensile strength is above 89 MPa. Polypropylene with 40% glass fiber also has optimum corrosion resistance vis-a-vis the main detergents used in the food and beverage industry.

In general, the solution according to the example embodiments, as stated above, does not in any way compromise the mechanical strength of the bearing unit. To be specific, as is known, calculation of the nominal load of the bearing unit only concerns parameters and dimensions regarding which steel has not been replaced by polymeric material. In particular, calculation of nominal loads relates mainly to, the thickness of the radially inner ring; the geometry of the raceway of the radially inner ring; the diameter of the row of rolling bodies; the dimensions of the rolling bodies; the thickness of the radially outer ring; and the geometry of the raceway of the radially outer ring. Furthermore, the sliding surface of the lips of the sealing devices is also still made of steel.

To sum up, none of the strength properties of the bearing unit have been modified in the present disclosure, dimensions and materials remaining unchanged. The same nominal load value as for a known bearing unit is thus guaranteed, but with much better corrosion protection.

In addition to the embodiments of the disclosure as described above, it is to be understood that there are numerous other variants. It is also to be understood that said embodiments are solely exemplary and do not limit the scope of the disclosure, its applications, or its possible configurations. On the contrary, although the above description enables those skilled in the art to apply the present disclosure in at least one exemplary configuration, it is to be understood that numerous variations of the described components may be devised, without thereby departing from the scope of the disclosure as defined in the appended claims, interpreted literally and/or according to their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:
1. A bearing unit comprising:
a radially outer ring stationary with respect to an axis of rotation;
a radially inner ring rotatable with respect to the axis of rotation, the radially inner ring comprises:
a stainless steel collar having a raceway;
a first sleeve; and
a second sleeve, the first and second sleeves are both made of reinforced polymeric material and are co-molded to the stainless steel collar on axially opposite sides of the stainless steel collar;
a row of rolling bodies interposed between the radially outer ring and the radially inner ring; and
two sealing devices arranged on axially opposite sides with respect to the row of rolling bodies, each sealing device contacting the stainless steel collar to form respective seals with the stainless steel collar.

2. The bearing unit of claim 1, wherein the stainless steel collar comprises a radially external cylindrical surface, the radially external cylindrical surface forms shoulders on axially opposite sides of the raceway, and the radially external cylindrical surface is in sliding contact with contacting lips of the two sealing devices.

3. The bearing unit of claim 2, in which the radially external surface comprises an axial length not less than the overall axial dimension of the contacting lips of the two sealing devices.

4. The bearing unit of claim 2, wherein the stainless steel collar comprises a radially inner cylindrical surface, the radially inner cylindrical surface comprises an axial length equivalent to a chord of a circumference whose center coincides with the center of the ring of rolling bodies, a first end of the chord being at the intersection of the circumference and a first radius, the first radius extending from the center of the circumference to a first point on the radially external cylindrical surface that is the furthest from the raceway on a first axial side of the raceway, a second end of the chord being at the intersection of the circumference and a second radius, the second radius extending from the center of the circumference to a second point on the radially external cylindrical surface that is the furthest from the raceway on a second axial side of the raceway.

5. The bearing unit of claim 2, further comprising first and second metal shields axially external with respect to the contacting lips of the respective sealing devices, the first metal shield being mounted by interference on a radially external surface of the first sleeve and the second metal shield being mounted by interference on a radially external surface of the second sleeve.

6. The bearing unit of claim 1, further comprising a clamping device configured to clamp the bearing unit to a machine shaft, the clamping device comprises a pair of grub screws which engage in a corresponding pair of threaded bushings, the second sleeve including two holes arranged circumferentially on the second sleeve, each threaded bushing of the pair of threaded bushings being disposed in one of the two holes.

7. The bearing unit of claim 6, wherein each bushing of the pair of threaded bushings is provided with anti-rotational features with respect to the second sleeve to prevent the bushings from rotating relative to the second sleeve.

8. The bearing unit of claim 1, wherein the stainless steel collar comprises a plurality of teeth arranged circumferentially on axial ends of the stainless steel collar, the plurality of teeth alternating with a plurality of grooves arranged circumferentially, and wherein the first sleeve and the second sleeve comprise, in a corresponding axial end facing the collar, a plurality of teeth arranged circumferentially alternating with a plurality of grooves arranged circumferentially, and wherein use of the plurality of the teeth of the stainless steel collar engage with corresponding grooves of the first and second sleeves, and the grooves of the stainless steel collar engage with corresponding teeth of the first and second sleeves sleeve to generate anti-rotational features.

9. The bearing unit of claim 1, wherein the reinforced polymeric material of the first sleeve and the second sleeve comprises a Shore A hardness degree not lower than 80.

10. The bearing unit of claim 9, wherein the reinforced polymeric material of the first sleeve and the second sleeve is Polypropylene 40% glass fiber.

11. The bearing unit of claim 1, wherein the row of rolling bodies comprises a row of balls.

12. A bearing unit comprising:
a radially outer ring stationary with respect to an axis of rotation;
a radially inner ring rotatable with respect to the axis of rotation, the radially inner ring comprises:
a metal collar having a radially external cylindrical surface and a raceway in the radially extending cylindrical surface;
a first sleeve having a radially external surface; and
a second sleeve, the first and second sleeves are both made of reinforced polymeric material and are co-molded to the metal collar on axially opposite sides of the metal collar;
a row of rolling bodies interposed between the radially outer ring and the radially inner ring;
a sealing device arranged on an axial side with respect to the row of rolling bodies, the sealing device comprising a contacting lip in sliding contact with the radially external cylindrical surface of the metal collar; and
a metal shield axially external with respect to the contacting lip, the metal shield being mounted by interference on the radially external surface of the first sleeve.

13. The bearing unit of claim 12, wherein the sealing device is a first sealing device, the axial side is a first axial side, the contacting lip is a first contacting lip, and the metal shield is a first metal shield, wherein the second sleeve includes a radially external surface, wherein the bearing unit further comprises a second sealing device and a second metal shield, the second sealing device being arranged on a second axial side opposite the first axial side with respect to the row of rolling bodies, the second sealing device comprising a second contacting lip in sliding contact with the radially external cylindrical surface of the metal collar, the second metal shield axially external with respect to the second contacting lip, the second metal shield being mounted by interference on the radially external surface of the second sleeve.

14. The bearing unit of claim 12, wherein the metal collar is made of stainless steel.

15. The bearing unit of claim 12, wherein the row of rolling bodies comprises a row of balls.

16. The bearing unit of claim 12, wherein the first sleeve and the metal collar each have first anti-rotational features to inhibit the first sleeve and the metal collar from rotating relative to one another, and the second sleeve and the metal collar each have second anti-rotation features to inhibit the second sleeve and the metal collar from rotating relative to one another.

17. A bearing unit comprising:
a radially outer ring stationary with respect to an axis of rotation;
a radially inner ring rotatable with respect to the axis of rotation, the radially inner ring comprises:
a metal collar having a raceway;
a first sleeve; and
a second sleeve having a hole arranged circumferentially on the second sleeve, the first and second sleeves are both made of reinforced polymeric material and are co-molded to the metal collar on axially opposite sides of the metal collar;
a row of rolling bodies interposed between the radially outer ring and the radially inner ring;
two sealing devices arranged on axially opposite sides with respect to the row of rolling bodies; and
a clamping device configured to clamp the bearing unit to a machine shaft, the clamping device comprising a threaded bushing and a grub screw engaged with the threaded bushing, the threaded bushing disposed in the hole of the second sleeve.

18. The bearing unit of claim 17, wherein the threaded bushing includes an anti-rotation feature to inhibit the threaded bushing from rotating within the hole of the second sleeve.

19. The bearing unit of claim 17, wherein the hole is a first hole, the threaded bushing is a first threaded bushing, and the grub screw is a first grub screw, wherein the second sleeve has a second hole arranged circumferentially on the second sleeve, wherein the clamping device comprises a second threaded bushing and a second grub screw engaged with the second threaded bushing, the second threaded bushing disposed in the second hole of the second sleeve.

20. The bearing unit of claim 19, wherein the first threaded bushing includes an anti-rotation feature to inhibit the first threaded bushing from rotating within the first hole of the second sleeve, and the second threaded bushing includes an anti-rotation feature to inhibit the second threaded bushing from rotating within the second hole of the second sleeve.

21. The bearing unit of claim 17, wherein each sealing device contacts the metal collar to form respective seals with the metal collar.

22. The bearing unit of claim 21, wherein each sealing device includes a contacting lip in sliding contact with the metal collar to form the respective seals.

23. The bearing unit of claim 22, wherein the metal collar is made of stainless steel.

24. The bearing unit of claim 17, wherein the row of rolling bodies comprises a row of balls.

25. The bearing unit of claim 17, wherein the first sleeve and the metal collar each have first anti-rotational features to inhibit the first sleeve and the metal collar from rotating relative to one another, and the second sleeve and the metal collar each have second anti-rotation features to inhibit the second sleeve and the metal collar from rotating relative to one another.

26. A bearing unit comprising:
a radially outer ring stationary with respect to an axis of rotation;
a radially inner ring rotatable with respect to the axis of rotation, the radially inner ring comprises:
a metal collar having a raceway, the metal collar having a plurality of teeth and a plurality of grooves arranged circumferentially on axial ends of the metal collar, the plurality of teeth alternating with the plurality of grooves;
a first sleeve having an axial end facing the collar, the first sleeve comprising a plurality of teeth and a plurality of grooves arranged circumferentially in the axial end of the first sleeve, the plurality of teeth of the first sleeve alternating with the plurality of grooves of the first sleeve, the teeth of the metal collar engaged with corresponding grooves of the first sleeve and the grooves of the metal collar engaged with corresponding teeth of the first sleeve to inhibit rotation of the first sleeve and the metal collar relative to one another; and
a second sleeve,
the first and second sleeves are both made of reinforced polymeric material and are co-molded to the metal collar on axially opposite sides of the metal collar;
a row of rolling bodies interposed between the radially outer ring and the radially inner ring; and
two sealing devices arranged on axially opposite sides with respect to the row of rolling bodies.

27. The bearing unit of claim 26, wherein the second sleeve has an axial end facing the collar, the second sleeve comprising a plurality of teeth and a plurality of grooves arranged circumferentially in the axial end of the second sleeve, the plurality of teeth of the second sleeve alternating with the plurality of grooves of the second sleeve, the teeth of the metal collar engaged with corresponding grooves of the second sleeve and the grooves of the metal collar engaged with corresponding teeth of the second sleeve to inhibit rotation of the second sleeve and the metal collar relative to one another.

28. The bearing unit of claim 26, wherein each sealing device contacts the metal collar to form respective seals with the metal collar.

29. The bearing unit of claim 28, wherein each sealing device includes a contacting lip in sliding contact with the metal collar to form the respective seals.

30. The bearing unit of claim 29, wherein the metal collar is made of stainless steel.

31. The bearing unit of claim 26, wherein the row of rolling bodies comprises a row of balls.

* * * * *